Jan. 10, 1967 R. T. SCHUMACHER 3,297,906
HIGH FREQUENCY ELECTRON DISCHARGE DEVICE OF THE TRAVELING WAVE
TYPE HAVING AN INTERCONNECTED CELL SLOW WAVE CIRCUIT
WITH IMPROVED SLOT COUPLING
Filed May 29, 1963 2 Sheets-Sheet 1
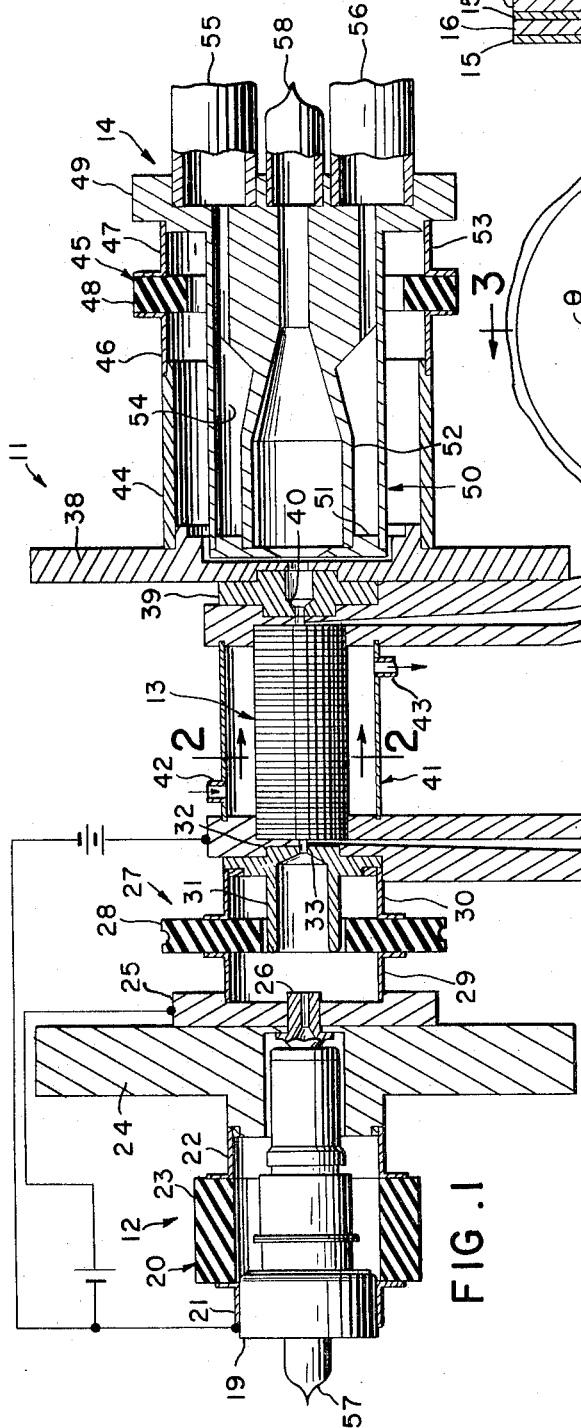
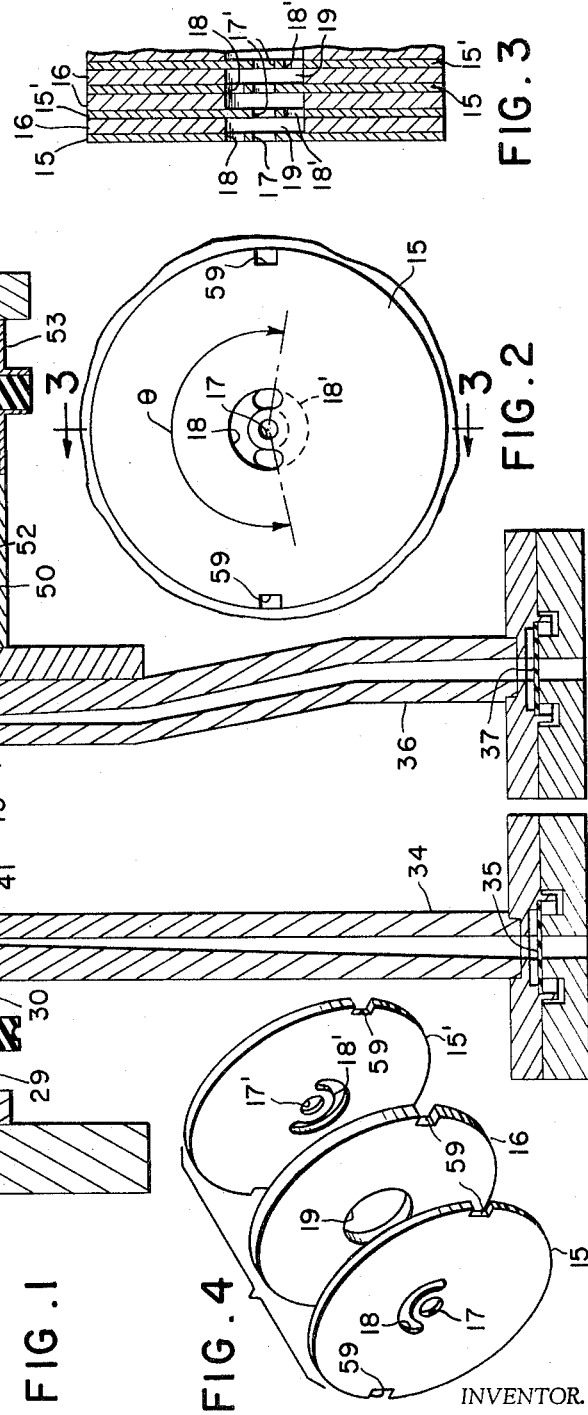
INVENTOR.
RICHARD T. SCHUMACHER
BY
*Harry E. Dine*
ATTORNEY

INVENTOR.
RICHARD T. SCHUMACHER
BY
ATTORNEY

United States Patent Office 3,297,906
Patented Jan. 10, 1967

3,297,906
HIGH FREQUENCY ELECTRON DISCHARGE DEVICE OF THE TRAVELING WAVE TYPE HAVING AN INTERCONNECTED CELL SLOW WAVE CIRCUIT WITH IMPROVED SLOT COUPLING
Richard T. Schumacher, San Jose, Calif., assignor to Varian Associates, Palo Alto, Calif., a corporation of California
Filed May 29, 1963, Ser. No. 284,257
6 Claims. (Cl. 315—3.5)

This invention relates in general to high frequency electron discharge devices of the traveling wave type and slow wave circuits associated therewith. Although the slow wave circuit described herein may be used in other devices, immediate application may be found in high power, broad bandwidth, millimeter wavelength backward wave oscillators.

An interconnected cell type wavelength structure is sometimes used as the wave energy propagating means in backward wave oscillators. In this type structure there is normally provided a series of interaction cells or cavities disposed adjacent each other sequentially along the axis of the tube. The electron stream passes through a beam hole in each cell along the axis of the tube and electromagnetic coupling is provided between the cavity and the stream. Each cavity is also coupled magnetically to an adjacent cavity by means of a coupling hole in the end wall defining the cavity. Generally, these magnetic coupling holes between adjacent cells are in the form of circumferentially directed slots subtending some angle of arc $\theta$ about the axis of the tube, disposed in close proximity to the beam hole alternately on opposite sides of the hole.

In this type structure bandwidth is directly proportional to the magnetic coupling between adjacent cells, which in turn is dependent on the angle of arc $\theta$. For low values of $\theta$, i.e. less than 180°, magnetic coupling between adjacent cells increases with increase in $\theta$. At the same time, however, an increase in $\theta$ decreases longitudinal interaction beam impedance. Therefore the current, i.e. beam density, necessary to start the tube oscillating in the case of a backward wave oscillator increases with decrease in impedance.

When operating in the millimeter wavelength range, beam density and operating potential has been limited, by the relatively small dimensions of the slow wave structure, and the inability of the structure to dissipate heat effectively. Hence in all prior art structures which are for operation in the millimeter wavelength range, bandwidth and power output have been quite limited.

In the present invention it was found that by making $\theta$ large, specifically greater than 180°, so that end portions of the slots in alternate walls overlap, magnetic coupling continues to increase, but now beam impedance also increases, decreasing the amount of current necessary to start the tube oscillating while at the same time making it possible to achieve broader bandwidth. It was also found that by disposing the slot further away from the beam hole, specifically, a distance greater than the width of the slot, good interaction is still obtained but thermal capacity is greatly increased. By making the width of the slot small compared to its length, specifically less than 1/6 its length, bandwidth may be further increased. In accordance with the teachings of the present invention a backward wave oscillator was constructed with a cold bandwave of nearly 400% and power output upwards of 1 watt C.W. output was delivered in the 45–75 gc. range for structure potentials between 2-8 kv.

The fabrication of slow wave structures to be used at millimeter wavelengths also presents difficulties due to their extremely small dimensions. In manufacturing the slow wave structure of the present invention a plurality of conductive laminations may be axially and angularly aligned, fired in a protective, non-oxidizing atmosphere, under pressure, to a temperature below the melting points of the metals used until, adjacent laminations flow together to form a single vacuum-tight slow wave structure. The method completely avoids the use of solder, brazing alloys, sealing materials and the like. This method forms the subject matter of a divisional application Serial No. 586,343, filed August 8, 1966 by Richard T. Schumacher and assigned to the same assignee as the present invention.

Accordingly it is the object of this invention to provide an electron beam discharge device for operation at millimeter wavelengths, having a very large bandwidth, capable of operating at high beam voltages and of delivering high average power output.

One feature of the present invention is the provision in an electron beam discharge device, such as, for example, a backward wave oscillator, of a novel slow wave structure of the interconnected cell type defined by a plurality of wall members having coupling holes between adjacent cells in the form of circumferentially directed slots subtending some angle of arc $\theta$ about the axis of said structure, the width of said slot being less than one-sixth its length.

Another feature of the present invention is the provision of a slow wave structure of the above type wherein the angle $\theta$ lies between 180° and 220°.

Still another feature of the present invention is the provision of a slow wave structure of either of the above types wherein said circumferentially directed slots are disposed 180° with respect to each other about said axis in successive wall members.

A further feature of the present invention is the provision of a slow wave structure of any of the above types wherein the distance between the inner radius of said slot and the radius of a beam aperture through said wall member is greater than the width of said slot.

These and other objects and features of the present invention and a further understanding may be had by referring to the following description and claims, taken in conjunction with the following drawing in which:

FIG. 1 is a longitudinal cross-sectional view of a backward wave oscillator of the present invention;

FIG. 2 is an enlarged cross-sectional view taken along the lines 2—2 of FIG. 1;

FIG. 3 is a cross-sectional view taken along the lines 3—3 of FIG. 2;

FIG. 4 is an enlarged exploded view of a portion of the slow wave structure of FIG. 1;

Figure 7:
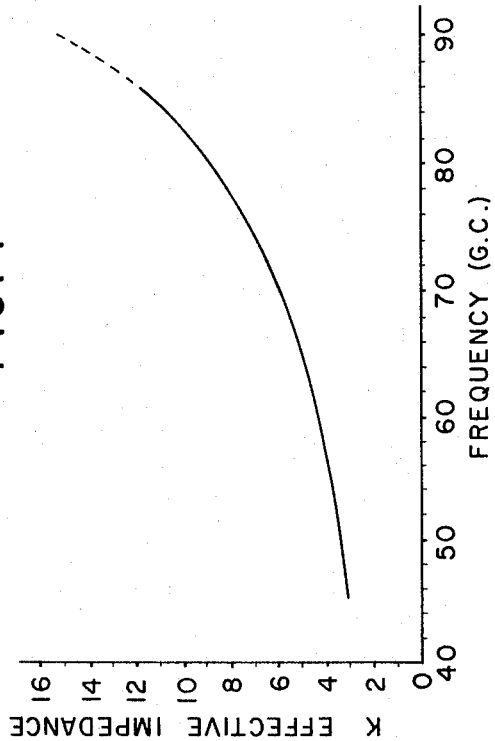
FIG. 7 is an impedance diagram for the slow wave structure of the present invention.

Referring now to FIG. 1 there is shown a backward wave oscillator tube 11 incorporating the novel features of the present invention. An electron beam is produced by a cathode assembly 12 disposed at one end of the tube 11. The beam is directed through the slow wave structure 13 where electromagnetic coupling is provided between the forward traveling beam and the oppositely traveling wave. The beam continues to travel through the slow wave structure 13 and is ultimately absorbed within the collector portion 14 mounted on the right hand end of the tube 11.

Referring now more particularly to FIGS. 2, 3 and 4, the novel slow wave structure 13 of the present invention is shown as comprising a plurality of apertured wafer-like conductive laminations, for example, copper, designated as digits 15, spacers 16 and inverted digits 15'. Each digit has a central circular aperture 17 for passage of the electron beam therethrough and a concentric slot or magnetic coupling hole 18 and 18' which forms an arc about the aperture 17. Spacers 16 are apertured discs, the radius of the aperture 19 conforming to the outer radius of the concentric slots 18 and 18' in the digits 15 and 15'. The inverted digits 15' are structurally the same as digits 15 except that in assembly slots 18' are positioned in 180° relationship relative to the slots 18. A digit 15, spacer 16, and inverted digit 15' make up a single interaction cell or cavity. In a typical embodiment of the present invention 77 digits .0035 inch thick, .25 inch in diameter, having a beam aperture with a radius of .0066 inch were used with 76 spacers .0055 inch thick, to form a slow wave structure .670 inch long.

As more clearly shown in FIGS. 2 and 4 each slot 18 has an inner radius larger than the radius of aperture 17 and an outer radius slightly larger than its inner radius. In this way slot 18 is close enough to aperture 17 to allow for good interaction, yet at the same time enough digit material remains between slot 18 and aperture 17 to insure good thermal conductivity from the electron beam region to the outer surface of the slow wave structure 13. Otherwise, the digits are likely to melt at this point and thereby destroy the structure. In a typical embodiment of the present invention, the slots had an inner radius of .0133 inch and an outer radius of .0228 inch.

Figure 5:
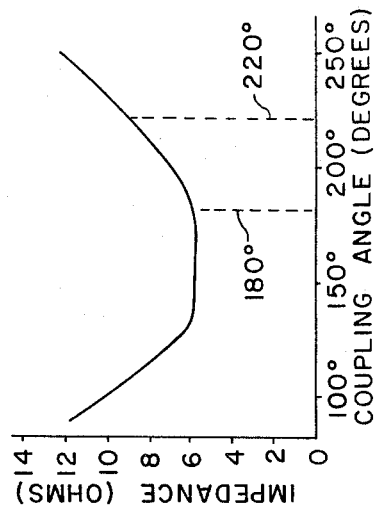
FIG. 5 is a graph of interaction impedance v. the angle angle of the arc $\theta$ which the coupling slot subtends about the axis of the novel slow wave structure of the present invention.

Bandwidth is directly proportional to the magnetic coupling between adjacent cells which is dependent on $\theta$, the angle of arc which the coupling slots circumscribe about the axis of the slow wave structure 21 (see FIG. 2). For low values of $\theta$, i.e. less than 180°, magnetic coupling between adjacent cells increases with an increase in $\theta$. However, for low values of $\theta$ longitudinal interaction beam impedance decreases with increase in $\theta$. Thus bandwidth is limited by the lower limit of the beam impedance. However, by increasing $\theta$ beyond 180°, so that a portion of the coupling slots overlap (see FIG. 2), it has been discovered that while the magnetic coupling continues to increase the beam impedance also increases, thus making it possible to achieve broader bandwidths (See the graph of FIG. 5). More specifically for values of $\theta$ greater than 180° but less than 220° extremely broad bandwidths were achieved. Beyond 220° the thermal capacity of the circuit becomes too small, due to decreased heat conduction paths. In a preferred embodiment of the present invention the angle $\theta$ utilized was 210°.

It is believed that the reason that the impedance begins to rise again for values of $\theta$ greater than 180° is because the electric fields between the opposed circuit elements are allowed to exist only in the region of beam interaction. That is, the "useless capacitance" between elements is minimized as the inductive coupling is increased.

By making the outer radius of the coupling slots only slightly larger than their inner radius the width of the slots can be made small when compared to their length, which length is also determined by the angle of the arc $\theta$. It has been found that the use of a very narrow coupling slot further increases bandwidth. In a preferred embodiment of the present invention the slot width is less than ⅕ its length.

Figure 6:
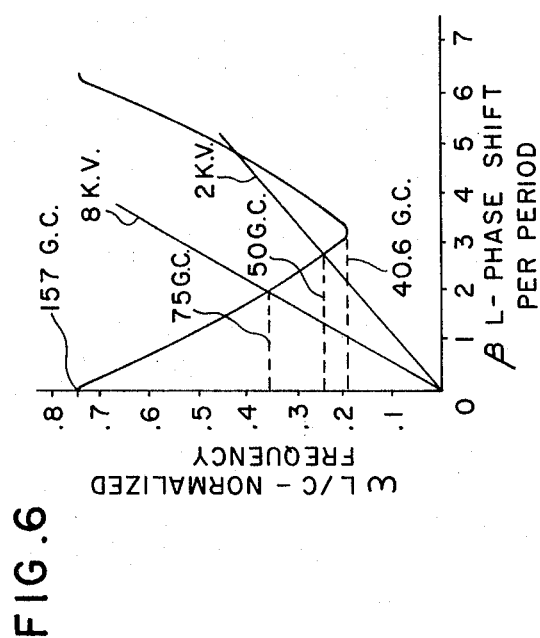
FIG. 6 is an $\omega$-$\beta$ diagram for the slow wave structure of the present invention.

Referring now to FIG. 6 there is shown a typical $\omega$–$\beta$ diagram for a slow wave structure constructed in accordance with the teachings of the present invention. It can be seen that the circuit operates on the backward fundamental space harmonic. The lower cutoff frequency of the circuit is 40.6 gc. and the upper cutoff frequency is 157 gc., a cold bandwidth of nearly 400%.

Figure 8:
FIG. 8 is a power output diagram for the backward wave oscillator of the present invention.

The effective interaction impedance for the backward wave oscilator is shown in FIG. 7. FIG. 8 is a typical power output v. frequency diagram for a backward wave oscilator tube constructed in accordance with the teachings of the present invention. Using appropriate anode to cathode to structure potentials, more than 1 watt continuous wave power output can be delivered in the 45 to 75 gc. range.

Referring back now to FIG. 1, an electron beam is produced by a cathode assembly 12 disposed at one end of the tube 11 and having an electron emissive cathode button (not shown) secured in the right hand end of the cathode assembly 12. The entire cathode assembly 12 is secured, as, for example, by brazing to a stem cup 19 which in turn is supported within a hollow high voltage insulator assembly 20 made up of a pair of metallic cup members 21, 22 having a ring shaped insulation member 23, as of, for example, ceramic sandwiched securely therebetween, as, for example, by brazing. The entire cathode end of the tube 11 is made vacuum tight by an insulation member (not shown) as for example, a ceramic insulating disc secured by brazing to stem cup 19. Electrical leads (not shown) pass through the sealing disc, serving as electrical connections for the heater (not shown) and cathode assembly 12.

High voltage insulator assembly 20 is secured to a centrally apertured magnetic pole piece 24, as, for example, iron. Secured to the other side of the pole piece 18 is an anode electrode 25 as of copper having a centrally positioned, truncated, non-magnetic opening portion 26 therein, as, for example, copper aligned with cathode assembly 12. Anode electrode 25 is connected through a lead (not shown) to a source of potential (not shown) which places it at a potential less negative than cathode assembly 12. Confined, convergent flow focusing is utilized, the anode electrode 25 serving to draw the electron beam from the cathode assembly 12 at high velocity through the opening in non-magnetic portion 26, which beam follows the magnetic flux lines threading the opening in non-magnetic portion 26. In one embodiment of the present invention there was 100 to 1 area convergence, the beam formed being .012 inch in diameter and focused through an opening .013 inch in diameter.

The novel slow wave structure 13 of the present invention, previously described, is secured to, but electrically insulated from, the anode electrode 25 by hollow anode insulator assembly 27 having a ring shaped insulation member 28, as of, ceramic, sandwiched securely between a pair of metallic cup members 29, 30. Cup member 30 is secured on its other end to an annular shield member 31 having an elongated multidiameter bore centrally disposed therein. Shield member 31 serves to prevent sputtered material from the anode region depositing on and shorting out the insulator 28. The downstream portion 32 of the shield member 31 nearest the slow wave structure 13 is funnel shaped before the beam converges to its minimum diameter region 33, and acts to shave the beam passing therethrough.

A waveguide 34 having an R.F. window seal 35 is coupled through an aperture at one end of the slow wave structure 13, and a second waveguide 36 having an R.F. window seal 37 is coupled through a second aperture at the other end of the slow wave structure 13. The output of the tube is derived from waveguide 34, while waveguide 36 functions as a waveguide terminal to guide forward waves to a termination external to the tube (not shown).

Mounted at the collector end of slow wave structure 13 is a centrally apertured magnetic pole piece 38 as of iron having a centrally positioned copper portion 39. The upstream half 40 of portion 39, nearest the slow wave structure 13, is funnel shaped away from the slow wave structure 13 as the beam disperses.

A jacket 41 through which a coolant is continuously circulated, as, for example, by means of inlet tube 42 and outlet tube 43 is disposed about the slow wave structure 13 to provide continuous cooling of the slow wave structure 13.

Mounted on the right hand end of the tube 11 as shown in the drawing is the collector portion 14. Collector portion 14 comprises a hollow cylindrical body extension member 44 secured on the one end to pole piece 38. A collector insulation assembly 45 comprising a pair of metallic cup members 46, 47 having a ring shaped insulation member 48 as of, ceramic, sandwiched therebetween is mounted on the other end of body extension member 44. The collector portion 14 of tube 11 is made vacuum tight by a metal disc 49 secured to the opposite end of cup member 47.

The collector electrode 50 comprises a ring portion 51 having a truncated opening therein axially aligned, to which is secured a conically shaped portion 52. The collector electrode 50 is supported within the end of a cooling jacket cylinder 53 which is in turn supported by the sealing disc 49. A cooling chamber 54 is thus formed between the outer surface of conical portion 52 and the inner surface of cylinder 53. A coolant input tube 55 which passes through sealing disc 49 supplies coolant, as, for example, water, to chamber 54, and a coolant output tube 56 which also passes through sealing disc 42 exhausts the heated coolant out of the coolant chamber 54. Collector electrode 50 serves to collect the electron stream. Portion 40, sometimes referred to as the "fly catcher," serves to prevent secondary emission electrons created in the collector portion 14 from re-entering the slow wave structure 13. By insulating the collector portion 14 of the tube from the remainder of the tube 11, collector electrode 50 may be connected to ground through a meter, (not shown) and in this manner measure the current being collected.

Evacuation tubes 57, 58 are attached through the discs on opposite ends of the tube 11. Evacuation during bakeout may be accomplished as rapidly as possible, and after the outgassing procedure, the evacuation tubes 57, 58 are pinched off.

A pair of permanent magnets (not shown) are positioned on opposite sides of the tube 11. Other means, of course, could be employed to provide the requisite field. Ordinarily, some type of insulating member (not shown) as of Teflon, is placed between the poles of the permanent magnets and pole pieces 24, 38, thick enough to electrically isolate them, but at the same time, not so thick as to disturb the magnetic circuit. In a preferred embodiment a Teflon boot .015 inch thick was used to insulate pole pieces 24, 38 from the poles of the permanent magnets.

In operation, a potential is applied to the anode 25 that is positive with respect to the cathode assembly 12, but negative with respect to the slow wave structure 13. By varying the voltage applied to the slow wave structure, the frequency of oscillation can be varied over an extremely wide range without a significant change of output power. The potential applied to the anode 25 regulates the beam current from the cathode assembly 12, and hence the power output, without greatly affecting the operating frequency. In a preferred embodiment, the anode 25 was operated at 2 kv. with respect to the cathode assembly 12, while the structure to anode potential was varied between 2 and 8 kv.

At millimeter wavelengths, the dimensions of the slow wave structure must be extremely small, and it becomes increasingly difficult to fabricate it. In manufacturing the slow wave structure 13 of the present invention a plurality of laminations where photoetched from a thin metal sheet, for example, copper. The laminations were then cleaned chemically, as for example, with any pre-brazing cleaner to render their surfaces free from contaminants. A plurality of clean laminations were then stacked in abutting relationship within a jig made of a material with an expansion coefficient less than that of the laminations, for example, stainless steel, the number of laminations depending on the length of slow wave structure desired. No brazing materials were used. A reference notch 59 was provided on the periphery of each of the laminations so that they could be aligned axially and angularly in the jig. The entire assembly was fired for about 15 minutes in a protective, non-oxidizing atmosphere, for example, hydrogen, to a temperature below the melting points of the metals used, typically 900° F. Longitudinal compression, resulting from the fact that the coefficient of thermal expansion of the jig material was appreciably lower than that of the lamination material, caused adjacent clean metallic laminations to flow together to form a single vacuum-tight slow wave structure. The structure is then slowly cooled.

The method completely avoids the use of solder, brazing alloys, sealing materials and the like. Further by aligning the structure externally, discontinuities along the inner surfaces where a wave is to be propagated and a beam to be passing through, can be avoided. The result is a smooth, vacuum-tight, low loss slow wave structure, having high thermal conductivity.

The notches 59 in the adjacent fused laminations form a slot along the outer periphery of the slow wave structure 13. If desired, a piece of metal of appropriate dimensions may be fitted into this slot, and secured thereto, as, for example, by brazing. Since the slow wave structure is already vacuum-tight and integral, the smoothness and continuity along the inner surface is in no way affected by the brazing along the outer periphery.

Although the invention has been described in its preferred form with a certain degree of particularity, it is understood that the present disclosure is made only by way of example and that numerous changes may be resorted to without departing from the spirit and scope of the invention.

What is claimed is:

1. An electron beam discharge device including a slow wave structure for providing interaction between an electromagnetic wave being propagated thereby and a beam of electrons being projected along a predetermined axis, comprising, a series of interaction cavities positioned successively along said axis, said interaction cavities being defined by a pluralty of wall members disposed successively across said predetermined axis and having successively aligned apertures for passage of said electron beam therethrough, a plurality of said apertured wall members each having a slot subtending an arc of a circle about said axis, the width of said slot being less than one sixth of the length of said slot, said slots in successively disposed wall members subtending a portion of the same arc about said axis, and means for spacing successive wall members apart in the direction of and along said axis.

2. The device according to claim 1 wherein said slot subtends an arc of a circle greater than 180° but less than 220° about said axis.

3. The device according to claim 2 wherein said slot in alternate wall members are disposed 180° with respect to each other about said axis.

4. The device according to claim 1 wherein the distance between the inner radius of said slot and the radius of said beam aperture is greater than the width of said slot.

5. The device according to claim 4 wherein said slot subtends an arc of a circle greater than 180° but less than 220° about said axis.

6. The device according to claim 5 wherein said slots in alternate wall members are disposed 180° with respect to each other about said axis.

References Cited by the Examiner
UNITED STATES PATENTS 3,099,767  7/1963  Gross _____ 315—3.6

References Cited by the Applicant
UNITED STATES PATENTS 3,099,765  7/1963  Meyerer.

HERMAN KARL SAALBACH, *Primary Examiner.*

R. D. COHN, *Assistant Examiner.*